United States Patent Office 3,402,535
Patented Sept. 24, 1968

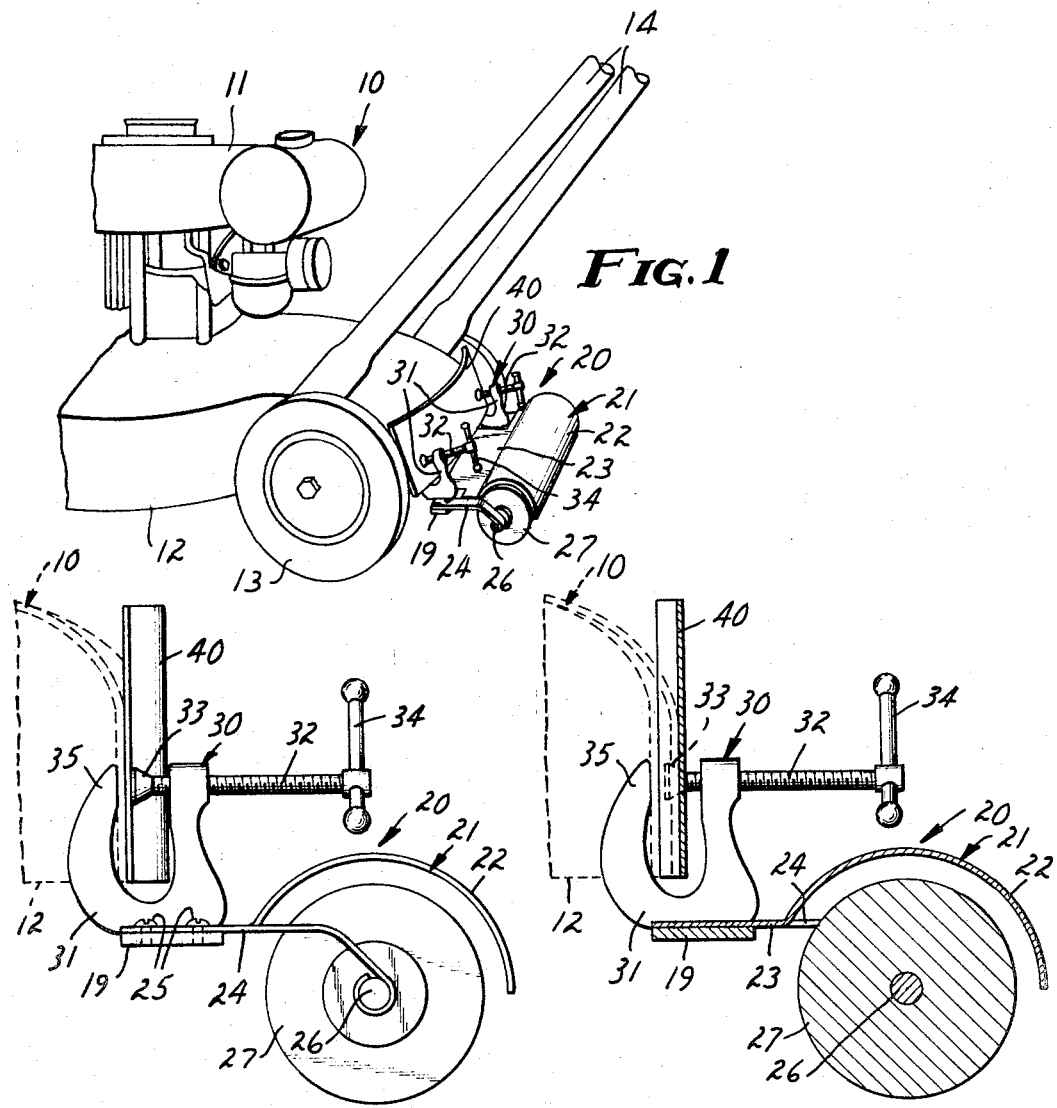

3,402,535
PROTECTIVE DEVICE FOR ROTARY
LAWN MOWERS
William F. Nelson, 1507 1st Ave. SE.,
Minot, N. Dak. 58701
Filed June 2, 1965, Ser. No. 460,790
4 Claims. (Cl. 56—25.4)

ABSTRACT OF THE DISCLOSURE

A fender adapted to be clamped onto the rear portion of the body of a rotary lawn mower in a fixed position, having an arcuate portion with a horizontally disposed roller mounted therein by springs so as to allow limited vertical movement to maintain the roller engaged with the ground during normal mowing operations.

This invention pertains to a protective device for rotary lawn mowers and more particularly to a protective device detachably connected to the body of a rotary power lawn mower which protects the operator from objects thrown by the lawn mower and protects the operator's feet from the blade of the lawn mower.

In prior art protective devices for rotary lawn mowers the device is usually such that technical assistance is required for attachment to the mower or many additional tools and equipment must be utilized. All of these devices are permanently attached to the mower or have brackets and the like permanently attached to the mower. Thus, the use of these devices is severely limited since they may only be attached to the mower in the permanent position constructed for them. In addition to being extremely difficult to attach to the mower, many of the prior art devices do not provide sufficient protection because they hang from the mower rather than contacting the ground with substantial downward pressure. Also, some of the prior art devices that have a downward pressure have a tendency to buckle under the mower. This creates problems for the operator when lifting the mower from the ground or moving it in any direction other than the forward direction in which it generally travels.

The present device rectifies all of these problems and provides many additional advantages. In particular the present device is attached to the body of a lawn mower by adjustable, removable means, which in the present embodiment is a pair of C-shaped clamps. Thus, the present device can be attached to the back and/or front of the mower with equal ease. Also, the device may be engaged or disengaged from a mower in a matter of a few seconds.

The present device also has a spring mounted roller within a fender the combination of which acts as a protective shield to prevent objects from flying toward the operator. The roller is in downbearing or pressing contact with the earth so that it aids movement of the lawn mower while preventing the operator from putting a foot thereunder. The roller mounting springs and the fender attaching means are such that the pressure of the roller on the ground may be varied to suit the operator and the lawn conditions. Thus, the present device rectifies the problems inherent in prior art devices while incorporating many additional advantages which will become apparent upon reading the specification.

It is an object of the present invention to provide a new and improved protective device for rotary lawn mowers.

It is a further object of the present invention to provide a protective device which is easily engaged or disengaged from a rotary lawn mower.

It is a further object of the present invention to provide a protective device which may be quickly and easily attached to the front or the back of a rotary lawn mower.

It is a further object of the present invention to provide a protective device which cannot buckle under the lawn mower or hamper the movement thereof in any other fashion.

These and other objects of this invention will become apparent to those skilled in the art upon consideration of the accompanying specification, claims, and drawings.

Referring to the drawings, wherein like characters indicate like parts throughout the figures:

FIG. 1 is a view in perspective, parts thereof broken away, of a rotary lawn mower having the present protective device attached thereto;

FIG. 2 is a view in side elevation;

FIG. 3 is a view in top plan, parts thereof broken away and shown in section; and FIG. 4 is a sectional view as seen from the line 4—4 in FIG. 3.

In the figures the numeral 10 generally designates a power lawn mower having a gasoline engine 11 mounted on the upper surface of a housing 12 and operably connected to a rotary blade, not shown, beneath the housing 12. The mower 10 has four wheels 13 attached to the housing 12 for movement across the surface of a lawn which movement is controlled by handles 14. The wheels 13 maintain the housing 12 spaced from the surface of the ground a sufficient distance to allow the mower 10 to move freely over the surface while the rotating blade thereunder cuts the grass. Because of the spacing between the bottom of the housing 12 and the ground heavy objects such as sticks, stones, etc. may be thrown by the rotating blades at great speeds from under the housing 12, thereby, greatly endangering the operator of the mower 10. Also, in manipulating the mower 10 the operator may inadvertently pull the mower onto his foot or in some instances if the mower hits an object the operator's foot might slide thereunder, thereby, badly maiming the operator.

The present protective device generally designated 20 has a fender 21 with a portion 22 having an arcuate cross section and a flat, substantially horizontal portion 23. An elongated flat bar 19 is attached along the underside of the front edge of flat portion 23 by some means such as welding and extends substantially past either end thereof. The flat bar 19 adds rigidity to the over-all device and could actually be eliminated if desired and if the fender 21 is composed of a sufficiently rigid material. A flat somewhat L-shaped spring member 24 is fixedly attached to the upper surface adjacent either end of the flat bar 19 by some means such as screws 25. The spring members 24 have one end attached to the flat bar 19 and the other end curving downwardly extends to approximately the axis of the arcuate portion 22. The end of the springs 24 extending to the axis of the arcuate portion 22 is bent into an approximately cylindrical shape about an axle 26 of an elongated roller 27. The elongated roller 27 is approximately the same length as the fender 21 and is rotatably mounted approximately coaxially within the arcuate portion 22 of the fender 21 by the springs 24.

The fender 21 is removably attached to the body 12 of the mower 10 by adjustable means, which in this embodiment are comprised of a pair of C-shaped clamps 30. Each of the C-shaped clamps 30 has a body 31 which is somewhat C-shaped with an elongated traveling member 32 threadedly engaged in an internally threaded hole through one arm thereof. One end of the traveling member 32 has a flat portion 33 rotatably attached thereto for vice-like cooperation with the other arm 35 of the body 31. The other end of the traveling member 32 has a handle 34 slidably engaged therewith and perpendicular thereto. The C-shaped clamp 30 is operated by placing the part it is desired to clamp between the end 33 of the traveling member 32 and the arm 35 of the body 31.

The handle 34 is utilized to rotate the traveling member 32 thereby moving the member 33 into vice-like cooperation with the arm 35.

The two C-shaped clamps 30 are fixedly attached, by some means such as welding, adjacent either end of the flat bar 19. The C-shaped clamps 30 are attached to the flat bar 19 so that the opening between the arm 35 and the end 33 of the traveling member 32 is positioned upwardly and the roller 27 extends downwardly. Thus, to attach the protective device 20 to the mower 10 the C-shaped clamps 30 are secured to the body 12 at the front or the back of the mower 10. In FIG. 1 the protective device 20 is illustrated attached to the back of the body 12 of mower 10 but it would also operate attached to the front of the mower 10 or if a protective device 20 were attached to the front and the back of the mower 10. A flat plate 40 is clamped in the C-shaped clamps 30 along with the back edge of the body 12 to add rigidity to the body 12.

The C-shaped clamps 30 may be utilized to increase the tension on the springs 24 and, thus, the downward pressure of the roller 27 by raising or lowering their point of contact with the body 12. As the C-shaped clamps 30 are lowered the tension on the springs 24 increases and as they are raised the tension decreases. Thus, the roller 27 is pressed against the ground by the weight of the mower 10, since the fender 21 is attached directly and rigidly to the body 12 of the mower 10.

The springs 24 provide a bias or a downward pressure on the roller 27, as well as rotatably mounting roller 27, to maintain the roller 27 in downbearing contact with the ground at all times while allowing some pivotal movement of the roller 27 relative to the fender 21. The springs 24 may be adjusted by bending them slightly to change the downward pressure on the roller 27 if desired or if necessary to maintain a sufficient spacing between the roller 27 and the arcuate portion 22 of the fender 21. In this fashion the roller 27 can partially support the mower 10, thereby, adding to the maneuverability of the mower 10, since in many instances the power mower 10 is used by pulling it backwards the roller 27 will encounter any upwardly extending objects, such as curbs and the like, before the housing 12 encounters such objects and will raise the mower 10 so that it may be pulled easily and smoothly over such objects.

Thus, the present protective device is inexpensive and simple to manufacture as well as extremely simple to use. Also the present protective device may be installed on a power mower by any operator within a matter of seconds, using no additional tools and may be further adjusted with no additional tools in approximately the same amount of time. In addition the present protective device is a positive acting device with no parts to fail and which adds to the maneuverability of the mower rather than detracting therefrom as in prior art devices.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

I claim:

1. A protective device for rotary lawn mowers comprising:
   (a) roller means;
   (b) a fender having a portion with an arcuate cross section and a substantially flat portion;
   (c) spring mounting means attached to said fender and rotatably mounting said roller means approximately coaxially within said arcuate portion for limited pivotal movement with respect to said fender; and
   (d) adjustable means removably mounting said fender on a lawn mower so said flat portion is adjacent thereto and substantially horizontal and said roller is in downbearing contact with the ground and spaced from said lawn mower.

2. A protective device for rotary lawn mowers as set forth in claim 1 wherein the spring mounting means are adjustable.

3. A protective device for rotary lawn mowers comprising:
   (a) an elongated roller;
   (b) a fender approximately the length of said roller having a portion with an arcuate cross section and a substantially flat portion each extending substantially the length of said fender;
   (c) spring mounting means attached to the ends of said fender and rotatably mounting said roller approximately coaxially within said arcuate portion; and
   (d) adjustable means removably mounting said fender on a lawn mower so said flat portion is adjacent thereto and substantially horizontal and said roller is in contact with the ground and spaced from said lawn mower.

4. A protective device for rotary lawn mowers as set forth in claim 3 wherein the adjustable means includes a pair of C-shaped clamps fixedly attached to the flat portion of the fender and spaced apart horizontally.

References Cited

UNITED STATES PATENTS

| | | | |
|---|---|---|---|
| 2,484,346 | 10/1949 | Iornis | 280—47.32 |
| 2,929,190 | 3/1960 | Woody | 56—26 |
| 2,963,842 | 12/1960 | Estes | 56—25.4 |
| 2,973,613 | 3/1961 | Hagedorn | 56—25.4 |

ABRAHAM G. STONE, *Primary Examiner.*

P. A. RAZZANO, *Assistant Examiner.*